United States Patent [19]
Bambini et al.

[11] Patent Number: 5,898,392
[45] Date of Patent: Apr. 27, 1999

[54] SYSTEM AND METHOD FOR REMOTE CONTROL OF AN IN-VEHICLE VOICE RECORDER AND OTHER ELECTRICAL ACCESSORIES

[75] Inventors: John S. Bambini, Kentwood; Matthew T. Nichelson, Zeeland; Ruskin T. Lhamon, Holland; Jason M. Denbow, South Haven, all of Mich.

[73] Assignee: Prince Corporation, Holland, Mich.

[21] Appl. No.: 09/021,078

[22] Filed: Feb. 10, 1998

[51] Int. Cl.⁶ .................................................. G08G 1/123
[52] U.S. Cl. ........................ 340/996; 379/88.24; 379/85; 379/88.28
[58] Field of Search ........................ 340/996, 995, 340/990, 991, 989, 988; 455/455, 456, 457; 379/283, 339, 77, 102.02, 102.03, 88.24, 88.25

[56] References Cited

U.S. PATENT DOCUMENTS

| | | | |
|---|---|---|---|
| 3,711,653 | 1/1973 | Barbier | 340/996 |
| 4,334,248 | 6/1982 | Maiocco | 340/996 |
| 4,941,203 | 7/1990 | Patsiokas et al. | 455/53 |
| 4,954,958 | 9/1990 | Savage et al. | 364/444 |
| 5,003,576 | 3/1991 | Halferich | 379/88 |
| 5,010,567 | 4/1991 | Tsushima | 379/77 |
| 5,133,081 | 7/1992 | Mayo | 455/18 |
| 5,170,164 | 12/1992 | Lewis | 340/988 |
| 5,206,641 | 4/1993 | Grant et al. | 340/905 |
| 5,276,731 | 1/1994 | Arbel et al. | 379/88 |
| 5,390,236 | 2/1995 | Klausner et al. | 379/67 |
| 5,406,492 | 4/1995 | Suzuki | 364/449 |
| 5,410,486 | 4/1995 | Kishi et al. | 364/449 |
| 5,428,542 | 6/1995 | Liesveld | 364/424.04 |
| 5,452,217 | 9/1995 | Kishi et al. | 364/449 |
| 5,479,157 | 12/1995 | Suman et al. | 340/825.31 |
| 5,543,789 | 8/1996 | Behr et al. | 340/995 |
| 5,544,225 | 8/1996 | Kennedy, III et al. | 379/59 |
| 5,552,993 | 9/1996 | Buchwitz et al. | 364/449 |
| 5,555,172 | 9/1996 | Potter | 364/424.01 |
| 5,579,377 | 11/1996 | Rogers | 379/74 |
| 5,717,387 | 2/1998 | Suman et al. | 340/825.31 |

OTHER PUBLICATIONS

Cadillac's OnStar® Internet Website as it appeared on Dec. 8, 1997.

*Primary Examiner*—Jeffery A. Hofsass
*Assistant Examiner*—Toan N. Pham
*Attorney, Agent, or Firm*—Price, Heneveld, Cooper, DeWitt & Litton

[57] ABSTRACT

A system for remotely controlling vehicle accessories is disclosed that allows a user to remotely control vehicle accessories using a conventional telephone. The system is particularly well-suited for use in controlling an in-vehicle voice recorder while recording therein navigational instructions formed of a plurality of navigational steps. Through remote control of the vehicle recorder, a recorded message may be segmented in response to DTMF signals generated by pressing keys on a keypad of a conventional telephone. A driver may then playback the navigational steps one at a time as needed while driving to the identified destination. The system further allows for remote control of other vehicle accessories through the manipulation of keys on a conventional telephone keypad.

33 Claims, 10 Drawing Sheets

SYSTEM AND METHOD FOR REMOTE CONTROL OF AN IN-VEHICLE VOICE RECORDER AND OTHER ELECTRICAL ACCESSORIES

BACKGROUND OF THE INVENTION

The present invention generally relates to a system for remotely controlling a voice recorder and other electrical accessories in a vehicle. More specifically, the present invention relates to a system for controlling of the recording of a voice message from a remote location in an in-vehicle voice recorder. The present invention is particularly well-suited for use as a vehicle navigation system.

Many different forms of systems have been proposed to provide the driver of a vehicle with information that the driver may use to navigate the vehicle. Some of these navigation systems include the combination of a display device, a GPS receiver, and a database to display to the driver a map upon which the vehicle's current location is displayed. Some such systems allow a vehicle occupant to input a desired destination such that a processor in the system may calculate a proposed route that is subsequently displayed to the user by highlighting the route on the displayed map. Navigation systems that include such displays have several drawbacks. One drawback is that the database used to generate the maps and to calculate the proposed route to the destination, includes only static information. Thus, such information does not take into account dynamic information such as which roads are under construction, subject to high levels of traffic, or are new or no longer in existence. Additionally, to provide sufficient details to the driver, the database must necessarily include an enormous amount of information about each location in which a driver of the vehicle may be expected to drive.

Yet another problem associated with vehicle navigation systems that include displays, is that the drivers must divert their eyes from the road to study the displayed map. Further, given the amount of detail that must be shown in a map to identify street names and the like, along with the vehicle's current location and the proposed route, such displays must be made rather large or otherwise the display will be difficult to read. The larger the display, however, the more of a safety hazard the display becomes, not only because it requires the drivers to continuously divert their eyes to the display, but also because such larger displays are likely to cause injury in the case of an accident.

Some navigation systems have been developed that overcome the above-mentioned problems by providing audible navigational information rather than visual information. One such system transmits a vehicle's current location and desired destination to a central processing center via a wireless communication link. The central processing center then calculates a proposed route based upon information contained in a central database. The central processing system then transmits data to the vehicle's system where the data is stored in memory and subsequently audibly played back to the driver through the use of a rather expensive voice synthesizer. The system may further transmit the navigational information in separate maneuver arms that may be played back to the driver one at a time so that the driver does not need to memorize each of the navigational steps that otherwise would be played all at once. An example of one such system is disclosed in U.S. Pat. No. 5,543,789.

The above-noted system, like the navigational systems that calculate a proposed route and display it on a map, require a driver or other vehicle occupant to input a desired destination into the vehicle's system. Thus, such systems require additional keypads or other forms of input devices to allow the driver to input the destination in a form that the system will be able to recognize as an address. Further, the address must be one that is provided in the database for the system to be able to propose a route for reaching that designation. As a result, such systems become fairly complex and expensive while requiring more and more of the limited space provided within the reach of the driver inside the vehicle.

Another problem with the above-noted navigational systems, is that such systems do not allow the users to subsequently ask questions about the proposed route. For example, a driver may wish to inquire about certain landmarks that may appear at an intersection where the driver must make a turn. Because the above navigational systems do not provide for such inquiries, these systems are generally perceived as not being very user-friendly.

To provide for a more user-friendly navigational aid, General Motors Corporation has offered a system known as OnStar®, that enables a driver to press a single switch within the vehicle to be connected via the cellular telephone communication link, to an operator whose sole duty is to assist drivers who may be lost or otherwise need directions to a particular destination. By enabling the driver to establish communication with a live person, the system allows the driver to verbalize the desired destination. Further, the operator may ask additional questions if this destination is not understood. Additionally, the operator may take into account traffic congestion when determining which route to recommend. Further still, the driver may subsequently ask questions pertaining to the recommended route. By providing a recorder in the vehicle, the driver may activate the recorder to record the directions provided by the operator for subsequent playback. Although this type of system solves much of the above-noted problems associated with those systems that do not provide for communication with a live person, this system does not provide for remote control of the in-vehicle recorder by the operator such that the operator may activate and deactivate the recorder. Further, for the driver to subsequently playback the recorded directions, the driver must listen to all the steps that are recorded just to hear any particular portion of the directions. This could become quite a nuisance to the driver if a description of the directions is quite lengthy.

To allow for remote actuation of other electrical accessories in the vehicle using the same communication link used to communicate navigational directions, such systems have utilized cellular modems for modulating and demodulating data communications received from remote locations. The use of such modems requires data to be delivered from a compatible modem. Because not all car owners have compatible modems and computers to communicate with their vehicle, such systems require the owners to speak with an operator each time they wish to remotely lock or unlock their doors or reprogram their vehicle's accessories.

SUMMARY OF THE INVENTION

Accordingly, it is an aspect of the present invention to overcome the above problems by providing a system that allows an operator to remotely control a recorder provided in a vehicle. Another aspect of the present invention is to provide a system that allows an operator to introduce acoustical data, such as dual-tone multi-frequency (DTMF) signals, during a voice communication in order to cause the in-vehicle recorder to recognize segments in the recorded voice message.

To achieve these and other aspects and advantages, the voice recording and playback device of the present invention comprises a receiver for receiving a voice message transmitted from a remote location via a wireless link, a memory device coupled to the receiver for recording a received voice message, input means for receiving playback commands from a vehicle occupant, and a control circuit coupled to the input means and including means for identifying acoustic data transmitted with a received and recorded voice message. The control circuit is responsive to an identification of acoustic data within a recorded voice message to divide the recorded voice message into separate segments at each location within the recorded voice message where acoustic data is identified. The control circuit then controls the memory device to playback a recorded voice message one segment at a time in response to playback commands received through the input means.

Preferably, the receiver is part of a cellular telephone transceiver and the voice message is included in a telephone call. Further, the acoustic data transmitted within the voice message is preferably DTMF signals generated either by activation of the keys on a conventional or customized telephone keypad or by an automated system capable of issuing DTMF tones. In such an implementation, the means for identifying the acoustic data is preferably a DTMF decoder. Thus, with the preferred construction, a person seeking directions while using this system may place a telephone call by activating a single button, to an operator who subsequently may press a specified key on the telephone keypad to generate a DTMF signal which activates the in-vehicle recorder. The operator then simply provides the requested directions one step at a time while pressing keys on the keypad to generate DTMF signals between each step to thereby introduce separators into the recorded navigational information. Subsequently, the driver may playback the recorded navigational information one step at a time by providing certain playback commands to the device.

An additional aspect of the present invention is to provide a system for remotely controlling vehicle accessories that allow for the remote control of accessories in the vehicle by the manipulation of keys on a conventional or customized telephone keypad. Yet another aspect of the present invention is to provide a system that allows for the operation of vehicle accessories to be personalized through remote manipulation of keys on a conventional or customized telephone keypad. Yet another aspect of the present invention is to provide an interactive system that receives telephone calls and provides audible prompts to the caller to press certain keys on the telephone keypad to affect the remote control and/or personalization of vehicle accessories.

To achieve these and additional aspects and advantages, the system of the present invention comprises a cellular telephone receiver for receiving cellular telephone calls, a DTMF decoder coupled to the cellular telephone receiver for decoding DTMF signals received during a telephone call, a vehicle bus interface for coupling to a vehicle bus, and a control circuit coupled to the vehicle bus interface and to the DTMF decoder for controlling and/or reprogramming electrical accessories that are coupled to the vehicle bus in response to received DTMF signals.

These and other features, advantages, and objects of the present invention will be further understood and appreciated by those skilled in the art by reference to the following specification, claims, and appended drawings.

DESCRIPTION OF PREFERRED EMBODIMENTS

Figure 1:
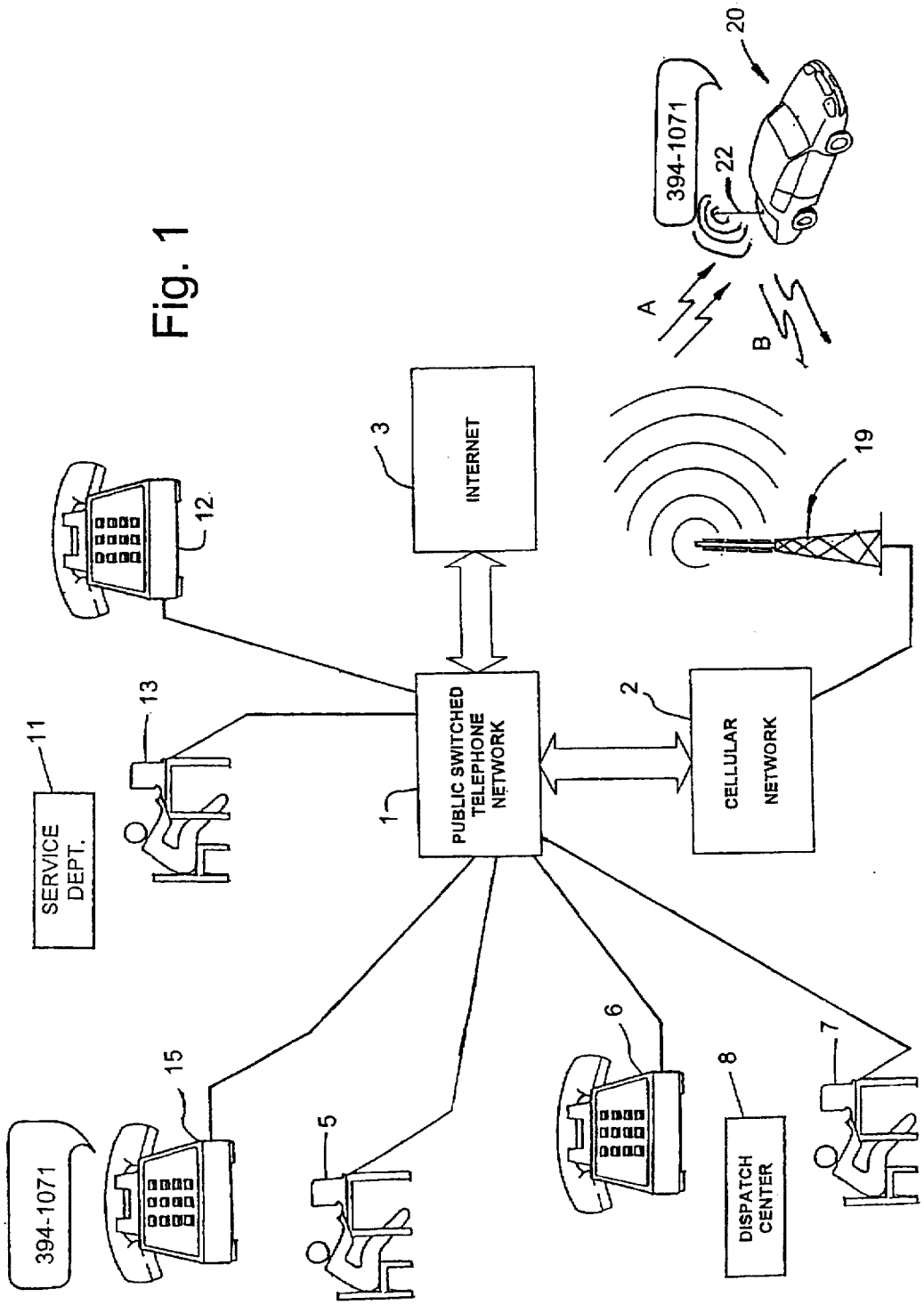
FIG. 1 is a schematic diagram depicting a system including a land-based transmitting station in communication with a vehicle having a communication and control system according to the invention.

FIG. 1 shows a land-based system for communicating with the vehicle communication and remote control system of the present invention as implemented in a vehicle 20. The system shown in FIG. 1 allows remote control signals and other commands to be issued to and received from a system within vehicle 20 via its antenna 22. In a preferred construction, the infrastructure that enables communications to be sent to and received from the vehicle communication system, utilizes a cellular network 2, which includes a plurality of base stations that transmit and receive RF signals to/from vehicle 20. Further, in a conventional manner, communications may be initiated or received through a public-switched telephone network (PSTN) 1 for transmission to or from a vehicle through cellular network 2. Further, such communications may be routed through a computer network such as the Internet 3, which is typically accessed through PSTN 1. Because the infrastructure including PSTN 1 and cellular network 2 are in existence and well-known in the art, the structure and function thereof are not discussed further.

Depending upon the form and nature of communication and any command signal sent to or received from the vehicle communication and control system of the present invention, different techniques for enabling transmission of such communications and control signals, may be employed. For example, if an individual wished to place a telephone call to the vehicle communication system in vehicle 20, the individual could place the telephone call on any conventional telephone 15 such that the call is routed to the vehicle in the conventional manner used to route a telephone call to a cellular telephone. Similarly, a call originating from the communication system in vehicle 20 may be routed to telephone 15 in any conventional manner. If, on the other hand, a 911 emergency call is originated using the vehicle communication system in vehicle 20, the call would preferably be initially routed to a network service center 11 where a service operator could utilize a computer 13 to identify the vehicle's location based upon a vehicle location signal generated by the vehicle communication system and transmitted with the 911 distress call. The service operator could then establish a two-way communication link with the vehicle occupants using a conventional telephone 12, while at the same time placing a call through PSTN 1 to establish a conference call with an operator using a telephone 6 or computer 7 at a 911 dispatch center. Similarly, if the vehicle occupant requests roadside assistance, the initial call and vehicle location signal would be transmitted to network service center 11 where an operator would subsequently contact a dispatch center 8 to have the appropriate form of assistance dispatched to the vehicle at the location identified in the location signal. Another alternative is for an individual to use a personal computer 5 to transmit a request through PSTN 1 and/or Internet 3 to service department 11 whereby the service department would then send the appropriate communications to vehicle 20.

Figure 2:
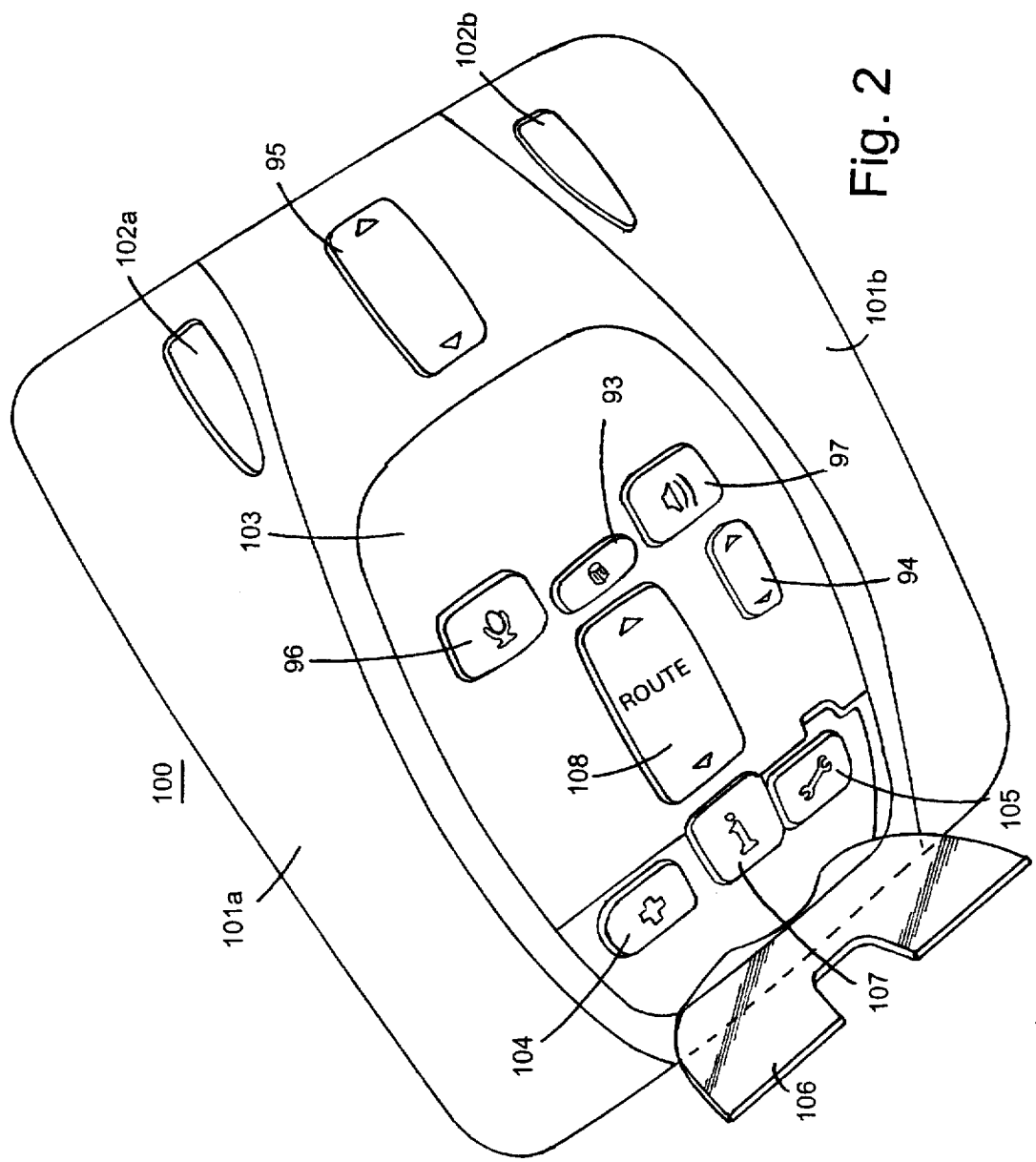
FIG. 2 is a pictorial representation of an overhead console constructed in accordance with one embodiment of the present invention.
Figure 3:
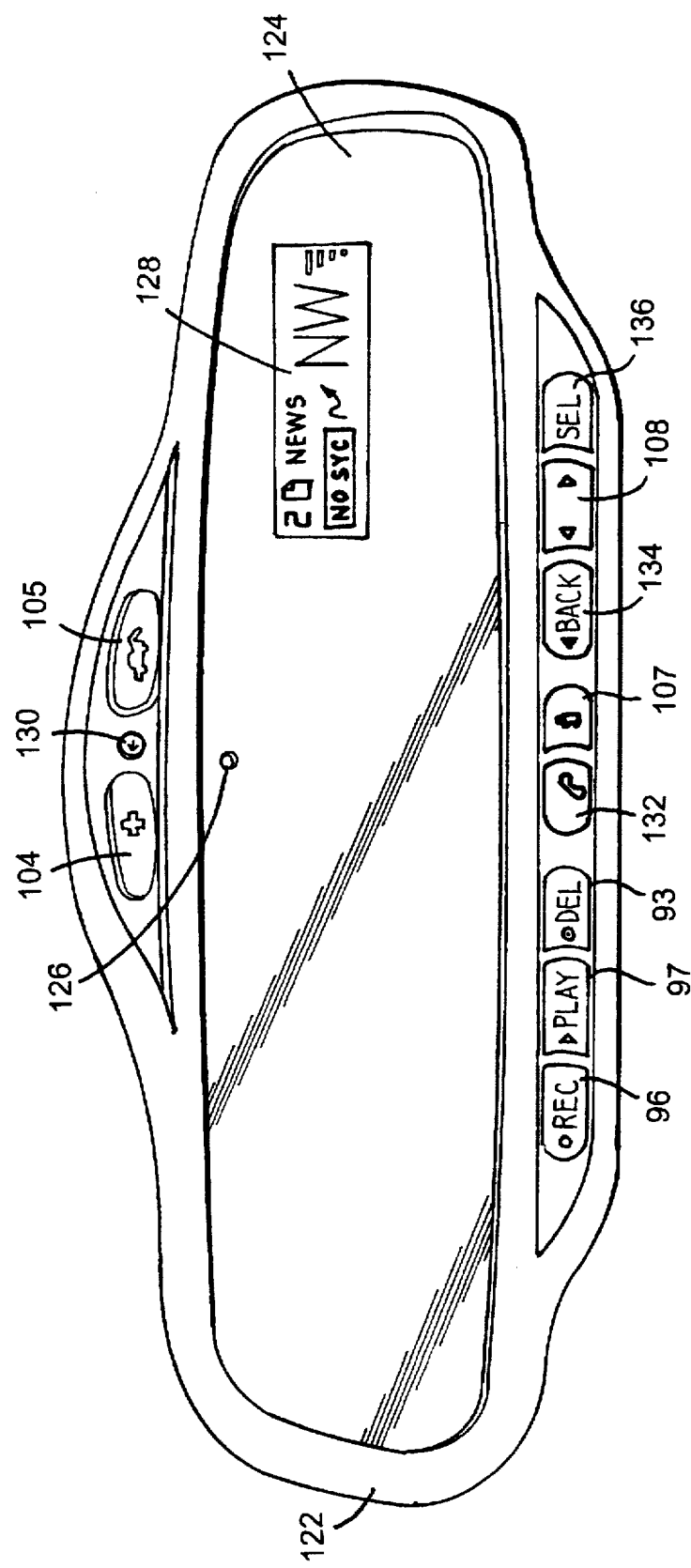
FIG. 3 is a pictorial representation of a rearview mirror constructed in accordance with another embodiment of the present invention.

The vehicle communication and control system of the present invention may be mounted in whole or in part in an overhead console or a rearview mirror such as those shown in FIGS. 2 and 3, respectively. It will be appreciated by those skilled in the art that the vehicle communication and control system of the present invention may be wholly or partially mounted in other accessories or components of the vehicle, such as a visor, instrument panel, armrest, steering wheel, or door of the vehicle. Further, the various antennas of the system as will be described below may be mounted on any location in the vehicle including the vehicle's trunk.

Figure 4:
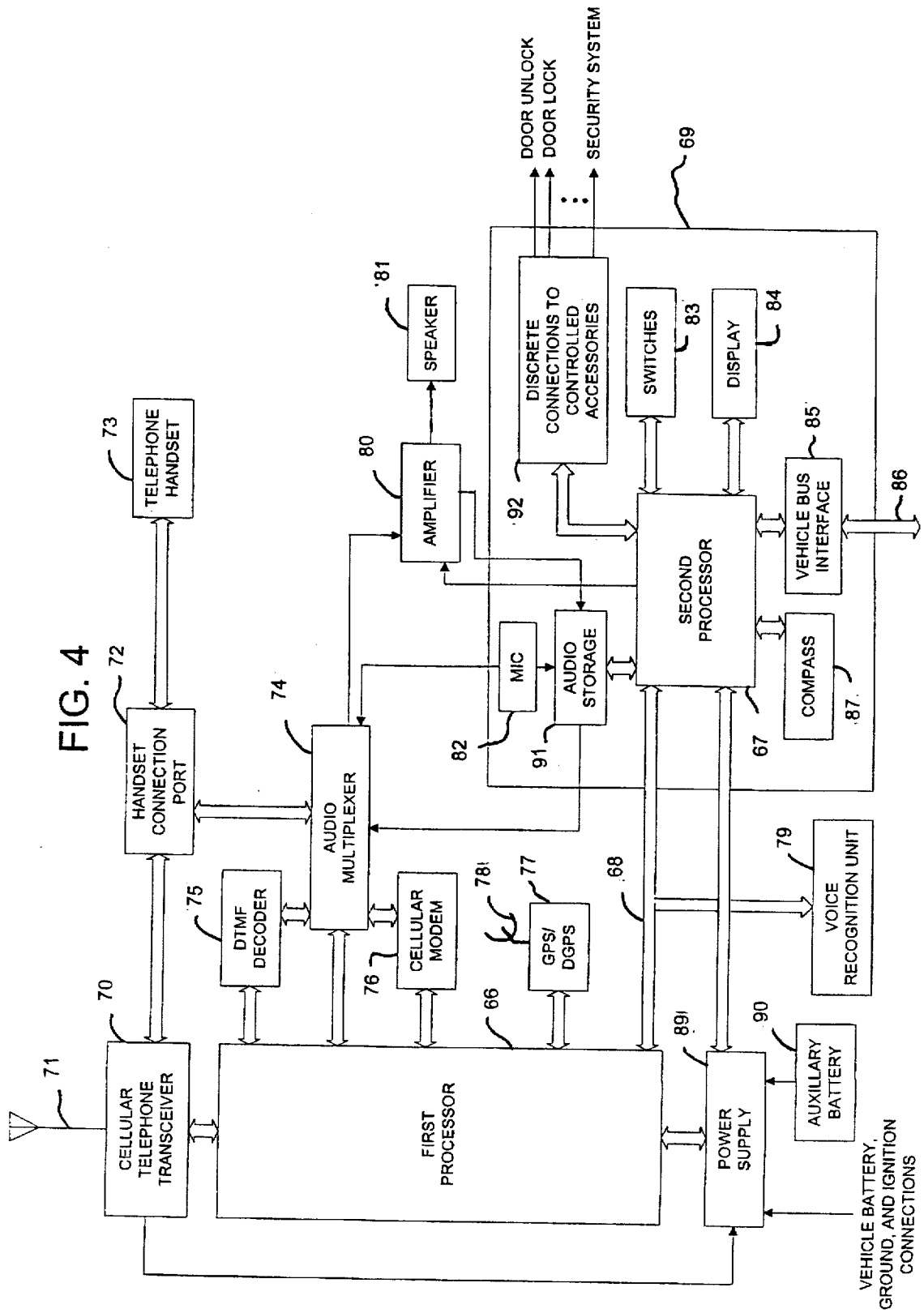
FIG. 4 is an electrical circuit diagram in block form of a vehicle communication and control system constructed in accordance with the present invention.

FIG. 4 shows an exemplary electrical circuit diagram for constructing a vehicle communication and control system in accordance with the present invention. As shown in FIG. 4, the communication and control system according to the present invention includes a first microprocessor 66 that works in communication and cooperation with a second microprocessor 67, which monitors inputs and provides outputs in a user interface portion 69 of the system of the present invention. First microprocessor 66 and second microprocessor 67 may be connected by a bus 68 that may be a serial or parallel common interface. Together, first and second microprocessors 66 and 67 monitor incoming messages and communications from a cellular telephone transceiver 70 and from various vehicle accessories and components coupled to microprocessor 67 via a vehicle bus interface 85 that is coupled to a vehicle bus 86.

Cellular telephone transceiver 70 may be a standard cellular transceiver that transmits and receives RF signals to and from a conventional cellular telephone antenna 71. Cellular telephone transceiver 70 is coupled to first microprocessor 66 and is also preferably coupled to a handset connection port 72 to which a telephone handset 73 may optionally be connected. With a handset connected to port 72, a user may place and receive calls using handset 73 in a conventional manner. Handset connection port 72 is also preferably coupled to an audio multiplexer 74 which, in turn, is coupled to a DTMF decoder 75 and a cellular modem 76. Cellular modem 76 is provided for transmitting and receiving data through cellular telephone receiver 70. DTMF decoder 75 and cellular modem 76 are preferably coupled to first microprocessor 66. The vehicle communication and control circuit of the present invention also preferably includes a GPS or differential GPS module 77 having a GPS antenna 78. The GPS/DGPS module 77 is coupled to first microprocessor 66 to provide an indication of the vehicle's location. As described further below, the GPS data generated by module 77 may be transmitted using cellular modem 76 with a call request transmitted to a service department 11 (FIG. 1), such that the service department may immediately know the location of the vehicle for purposes of informing an emergency dispatcher or for providing navigational instructions to the driver. This aspect of the invention is particularly advantageous since it takes into account a situation where the driver is lost and cannot articulate their current location.

The system may further include a voice recognition unit (VRU) 79, which is coupled to bus 68 to receive and send control signals and voice data to first or second microprocessor 66 and/or 67. VRU 79 may be used for the recognition of voice commands that may be delivered from a microphone 82 provided in user interface 69 or for recognition of commands that may be delivered via handset 73 or cellular telephone transceiver 70. By providing VRU 79, the system may be voice actuated to perform its many and various functions. An example of a voice recognition unit that may be used in a vehicle system, is disclosed in U.S. Pat. No. 4,827,520 issued on May 2, 1989.

By providing the system with an audio amplifier 80, a speaker 81, and a microphone 82 that are coupled to audio multiplexer 74, two-way voice communication may be accomplished without requiring handset 73. Speaker 81 may be a dedicated speaker provided in the user interface 69, or may be a speaker that is otherwise provided in the vehicle, such as a speaker of the vehicle's audio system.

The system according to the present invention further includes an audio storage circuit 91 coupled to audio multiplexer 74, microphone 82, and amplifier 80 for receiving voice messages, digitizing them, and storing them in its internal memory. Audio storage device 91 is preferably coupled to second microprocessor 67, which controls the recording and playback of voice messages.

When a person calling from a remote location presses a specified key on their telephone keypad, their telephone generates a DTMF signal uniquely identified with that key. This DTMF signal, which is an audible tone having a unique frequency, is then transmitted through the voice communication link established with the in-vehicle system. Cellular telephone transceiver 70 receives the DTMF signal along with the speech signals and delivers these audio signals to audio multiplexer 74 via handset connection port 72. Audio multiplexer 74 delivers these signals to DTMF decoder 75, which monitors the received audio signals for tones having specified frequencies. When such a tone is identified by DTMF decoder 75, it signals first microprocessor 66 that such a DTMF tone has been detected and which key on a telephone keypad to which the received tone corresponds. First microprocessor 66 is programmed to respond by performing predetermined functions in response to such DTMF signals. For example, once a voice communication link has been established with a service department 11 (FIG. 1), first microprocessor 66 may be programmed to respond to the DTMF tone associated with the "*" keypad by instructing second microprocessor 67 to control audio storage device 91 to begin recording the voice message transmitted in the call and delivered thereto via handset connection port 72, audio multiplexer 74, and amplifier 80 (step 263, FIG. 8B).

User interface 69 may include one or more switches that may perform various functions depending upon the system's mode of operation or that perform discrete functions regardless of the mode of operation. For example, as shown in FIG. 2, the invention may be implemented with the user interface 69 provided in an overhead console 100 that includes a dedicated switch 104 for requesting emergency assistance, a dedicated switch 105 for requesting roadside assistance, and an information request switch 107 that is a dedicated switch for requesting information from an operator at a network service center. Also included in the exemplary interface shown in FIG. 2 is a two-way toggle switch 94 that is provided for adjusting the volume of the audio output produced by a speaker 81. Speaker 81 may be provided behind a grid 103 forming part of the exterior surface of console 100.

Console 100 further includes a two-way toggle switch 108 provided for playing either the previous or the next recorded navigational step. A playback switch 97 is also provided to playback recorded navigational instructions or other recorded messages, which may be received through the cellular telephone transceiver 70 or may be dictated by pressing a record switch 96 to thereby activate microphone 82. The manner by which this operation is performed is described in more detail below. Also provided is a switch 93 for deleting recorded messages.

As shown in FIG. 2, overhead console 100 may further include a pivotable cover 106 that may be transparent, translucent, or opaque, for covering up and thereby preventing inadvertent activation of one of switches 104 and 105, which are used to request emergency or roadside assistance. Console 100 may also include map lamps 101a and 101b which are selectively illuminated using switches 102a and 102b, respectively. Additionally, other switches may be provided on overhead console 100, such as a sunroof open and close switch 95.

It will be apparent to those skilled in the art that various other switches or combinations thereof may be provided to enable a user to readily manipulate the information displayed or to enter data using these switches. As shown in FIG. 3, the present invention may be implemented in whole or in part in a rearview mirror 120. Rearview mirror 120 includes a mirror housing 122 and a mirror, which may be a conventional mirror or a mirror having a reflectivity that is electronically adjustable, such as an electrochromic mirror 124. To allow such a mirror to dynamically respond to varying levels of light directed onto its surface by changing its reflectivity, a light sensor 126 is provided. A display 128 may optionally be provided on the surface of mirror 124 or provided adjacent the mirror on a rearward facing surface of housing 122. Housing 122 may be further provided with an aperture 130 in which microphone 82 (FIG. 4) may be mounted.

Like overhead console 100, rearview mirror 120 may include a 911 switch for requesting emergency service, a switch 105 for requesting roadside assistance, an information request switch 107 for requesting information from an operator at a network service center, a record switch 96, a playback switch 97, a delete switch 93, and a two-way toggle switch 108 to allow a user to advance or backup in a sequence of recorded navigational instructions. Mirror 120 may further include a telephone switch 132 for initiating the requisite actions to originate a telephone call from within the vehicle. The telephone switch 132 may further be used to answer a telephone call. Other switches including a back switch 134 and a select switch 136 may be provided to allow a user to select from various operational options that may be displayed on display 128. It should further be noted that the functions affected by operation of any of the switches on housing 122 may vary depending upon the selected mode of operation of the system. For example, two-way toggle switch 108 may be used to move As through a list of displayed options for subsequent selection using select switch 136.

User interface 69 may optionally include a display 84, which is coupled to second microprocessor 67 for the display of various control menus and received text messages. The system of the present invention may further include an electronic compass 87 coupled to second microprocessor 67 for providing the vehicle's heading that may in turn be displayed on display 84 or may be transmitted in a communication signal through transceiver 70. In this manner, a service operator may be able to determine which direction the vehicle is heading from the location identified by the GPS/DGPS module 77. The system further preferably is powered by a power supply module 89 that receives its power from the vehicle's battery or alternator. Power supply circuit 89 may be powered by an auxiliary battery 90 that is provided to power the system in the event that power is interrupted from the vehicle battery. This would allow the system to transmit a distress signal even when an accident has occurred that is so severe that it has interrupted the supply of power from the vehicle's battery.

Figure 5:
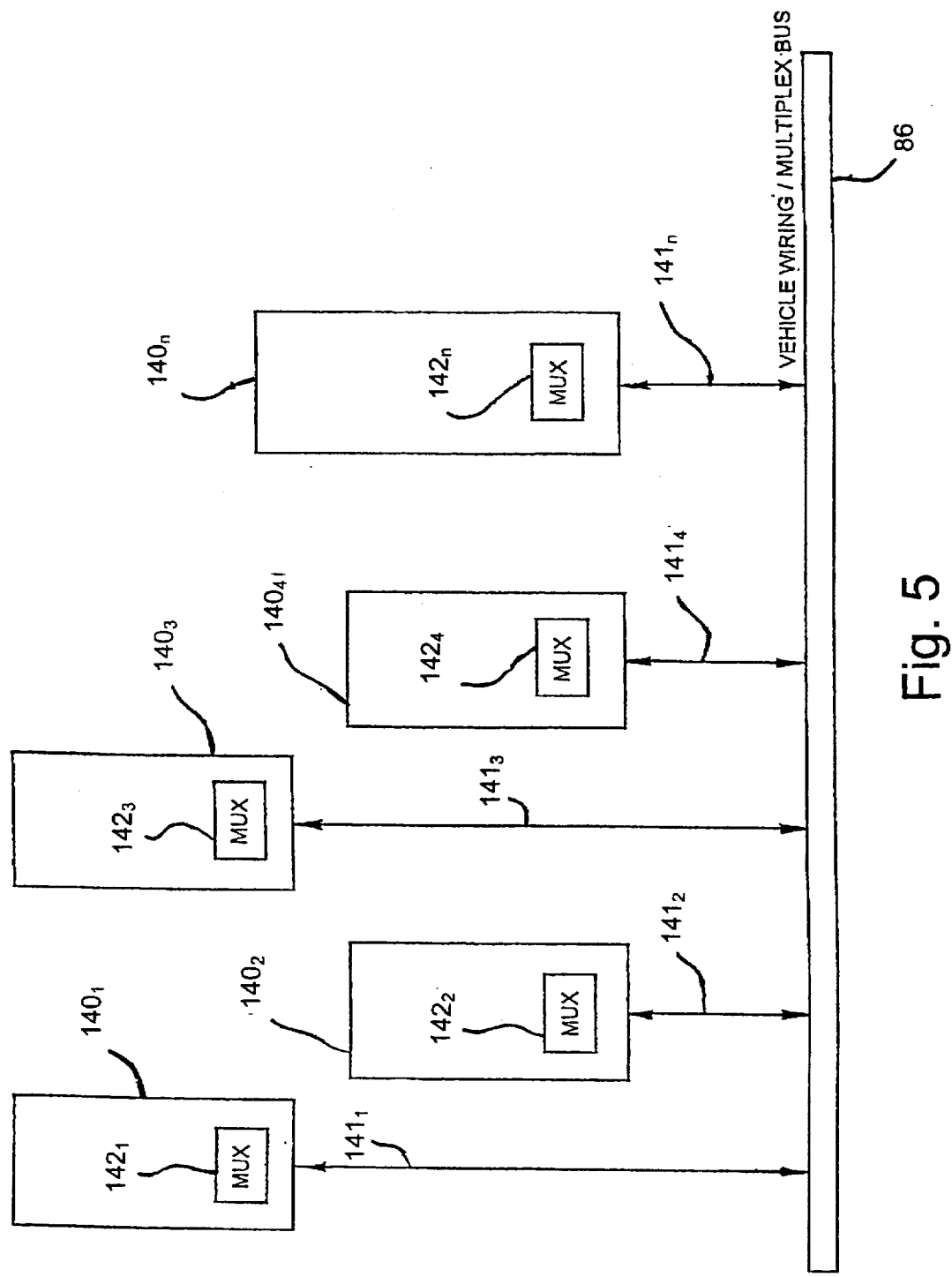
FIG. 5 is an electrical circuit diagram in block form of a plurality of electrical vehicle accessories connected to the vehicle bus and controlled by the circuit shown in FIG. 4.

As described in further detail below, some of the functions that may be performed using the above-described system, include remote control actuation and/or reprogramming of various electrical accessories within the vehicle. As shown in FIG. 5, such vehicle accessories $140_1$–$140_n$ may be connected to vehicle bus 86 via connectors $141^1$–$141_n$ and multiplexers $142_{1-142n}$, respectively, so as to receive command signals generated by second microprocessor 67 and transmitted to vehicle bus 86 through a vehicle bus interface 85. Alternatively, if the vehicle accessories are not coupled to a vehicle bus 86, control signals may be transmitted to to the vehicle accessories from second microprocessor 67 through discrete connections 92 to the controlled accessories. In addition, the operation of such vehicle accessories may be personalized by effectively reprogramming the parameters under which they operate. Having described the basic structure for carrying forth the underlying concepts of the invention, a detailed description of the operation of these components is described below with reference to the flowcharts shown in FIGS. 6–9.

Figure 6:
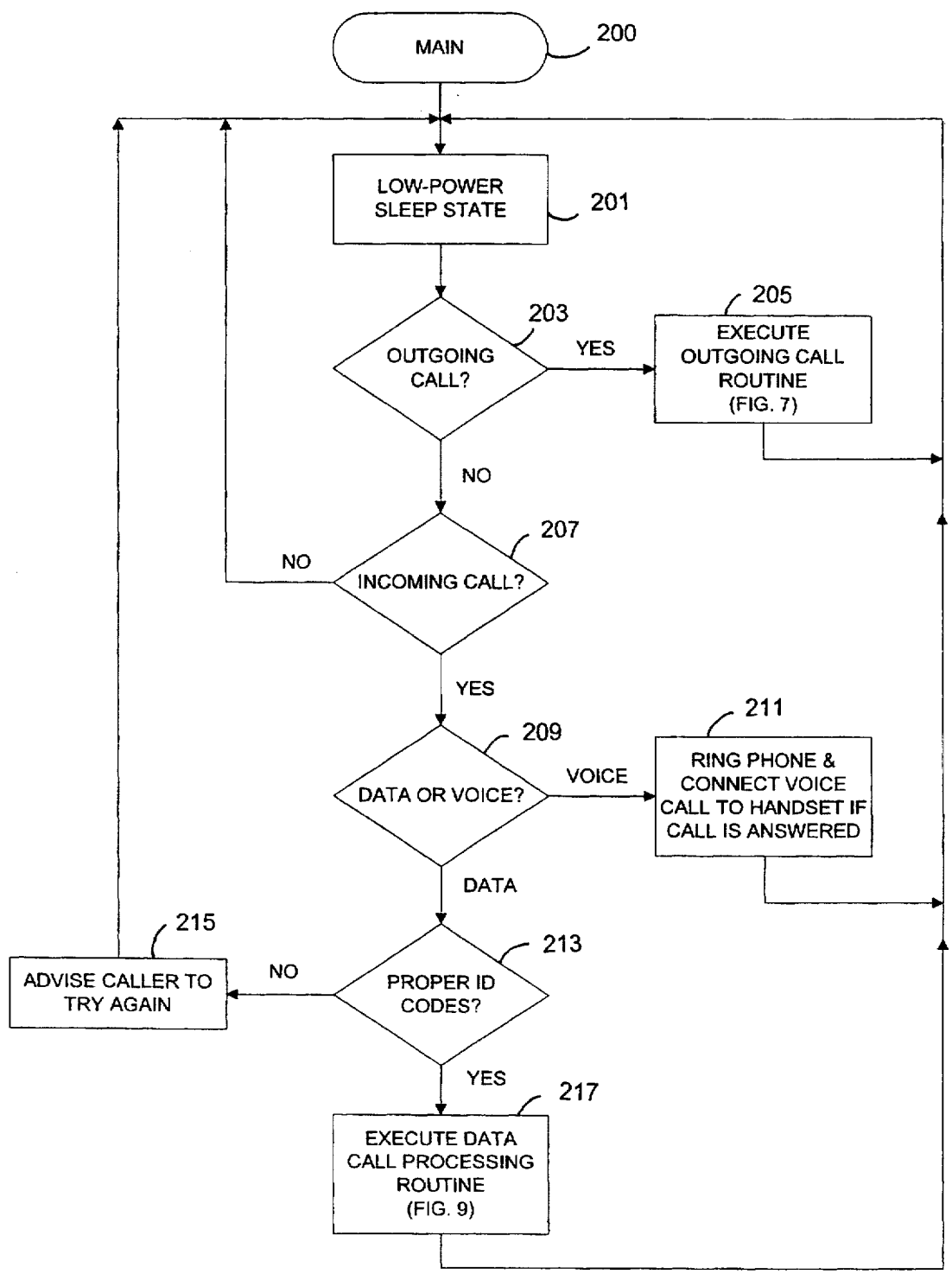
FIG. 6 is a flow diagram illustrating an exemplary main control program executed by a first microprocessor 66 shown in FIG. 4.

In operation, first microprocessor 66 performs the main control loop 200 as illustrated in FIG. 6. To prevent undue drain on the vehicle's battery, the system generally operates in a low-power sleep state 201 from which it is periodically awakened by an interrupt signal generator to perform the steps outlined below prior to falling back into the low-power sleep state 201. When awakened, first microprocessor 66 communicates with second microprocessor 67 to determine whether a switch 83 has been pressed to initiate an outgoing telephone call (step 203). If an outgoing call request has been received, first microprocessor 66 executes an outgoing call routine 205 that is described in more detail below with reference to FIG. 7. If no outgoing call request has been received, first microprocessor 66 checks whether an incoming call has been received in step 207. If no incoming call has been received, first microprocessor 66 either reenters the low-power sleep state (step 201) or performs other tasks.

If first microprocessor 66 receives a signal from transceiver 70 indicating that an incoming call is being received (step 207), first microprocessor 66 checks whether or not the incoming call is a data call or a voice call (step 209). If the incoming call is a voice call, first microprocessor 66 rings the telephone or otherwise signals the vehicle occupants of the incoming call and connects the call through to the handset if the call is answered (step 211). In general, such an incoming voice call would be handled in a conventional manner.

If the incoming call is a data call, first microprocessor 66 answers the call and checks whether the proper identification codes have been transmitted (step 213). If not, microprocessor 66 may advise the caller to try again (step 215) or otherwise terminate the call. If, in step 213, first microprocessor 66 determines that an identification code corresponding to the vehicle and a proper access code have been received, first microprocessor 66 then executes a data call processing routine 217 that is described in detail below with respect to FIG. 9.

Figure 7:
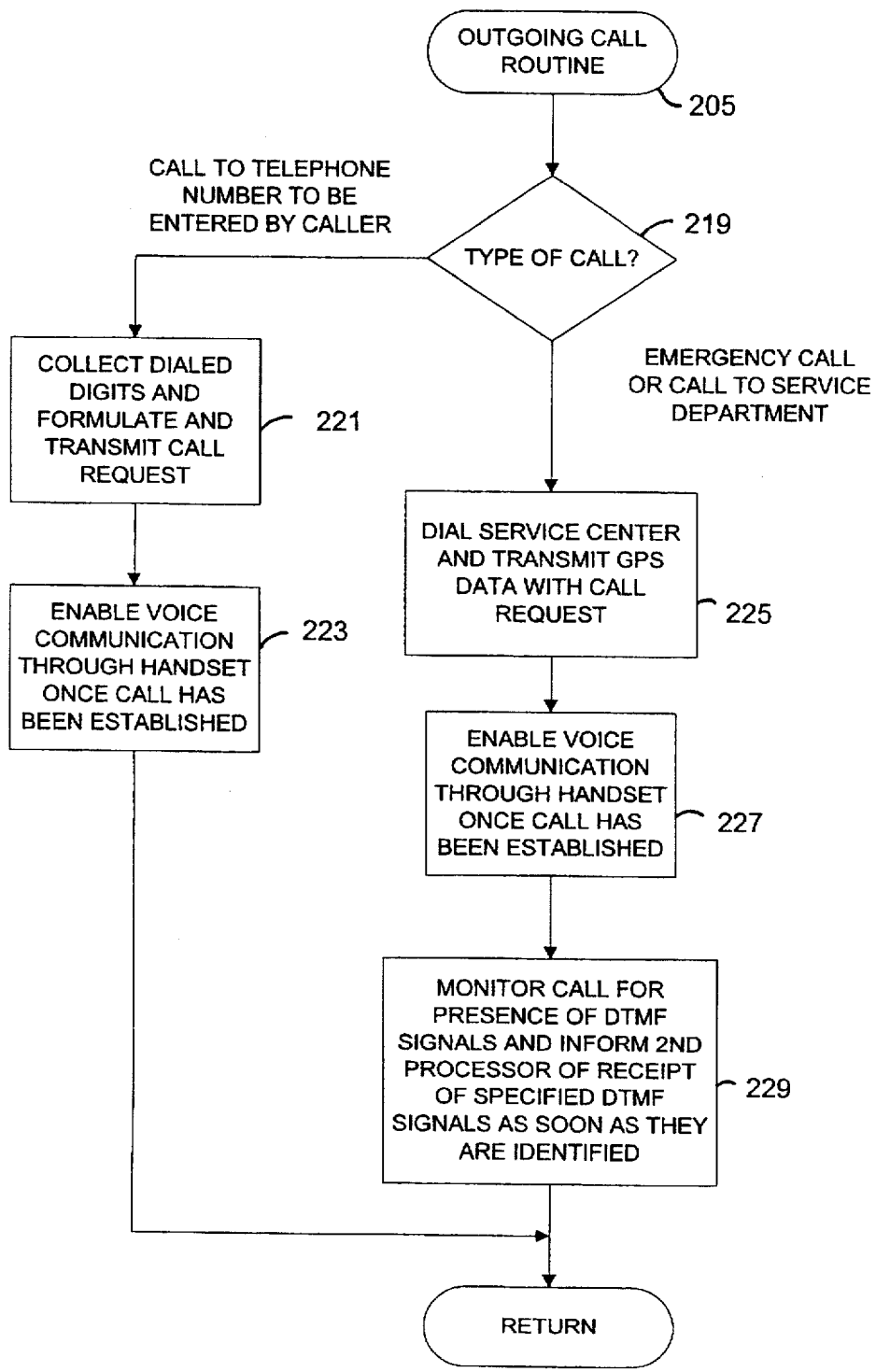
FIG. 7 is a flowchart illustrating an outgoing call routine executed by first microprocessor 66.

When an outgoing call has been requested, first microprocessor 66 executes the outgoing call routine 205. As shown in FIG. 7, the first step in this routine is for first microprocessor 66 to determine what type of outgoing call has been requested (step 219). If the user has requested a call in which the phone number to be dialed is one entered manually by the user or one previously manually entered and stored by the user using telephone handset 73, first microprocessor 66 collects the dialed digits and formulates and transmits a call request in step 221. First microprocessor 66 then enables voice communication through handset 73 in the conventional manner.

If the user has pressed either of the switches for emergency service, roadside assistance, or information service, second microprocessor 67 so informs first microprocessor 66, which responds by reading from memory the telephone number for the nearest service center and transmitting a call request to the service center along with GPS data representing the vehicle's current location. Alternatively, the stored telephone number for the service center may be a 1-800 or 1-888 number that receives the call and reads the GPS data to determine the nearest service center to which the call is then routed. Once a voice link with the service center has been established, first microprocessor 66 enables voice communication through handset 73 or through microphone 82 and speaker 81 (step 227). Then, first microprocessor 66 monitors the call for the presence of DTMF signals and informs second microprocessor 67 of the receipt of specified DTMF signals as soon as they are identified (step 229). As explained further below with reference to FIGS. 8A and 8B, second microprocessor 67 utilizes the received DTMF signals to perform functions such as activating or deactivating the in-vehicle recorder or indexing a message while it is being recorded for purposes of separating the recorded message into segments that may be thereafter played back one step at a time through manipulation of one of switches 83.

Figure 8A:
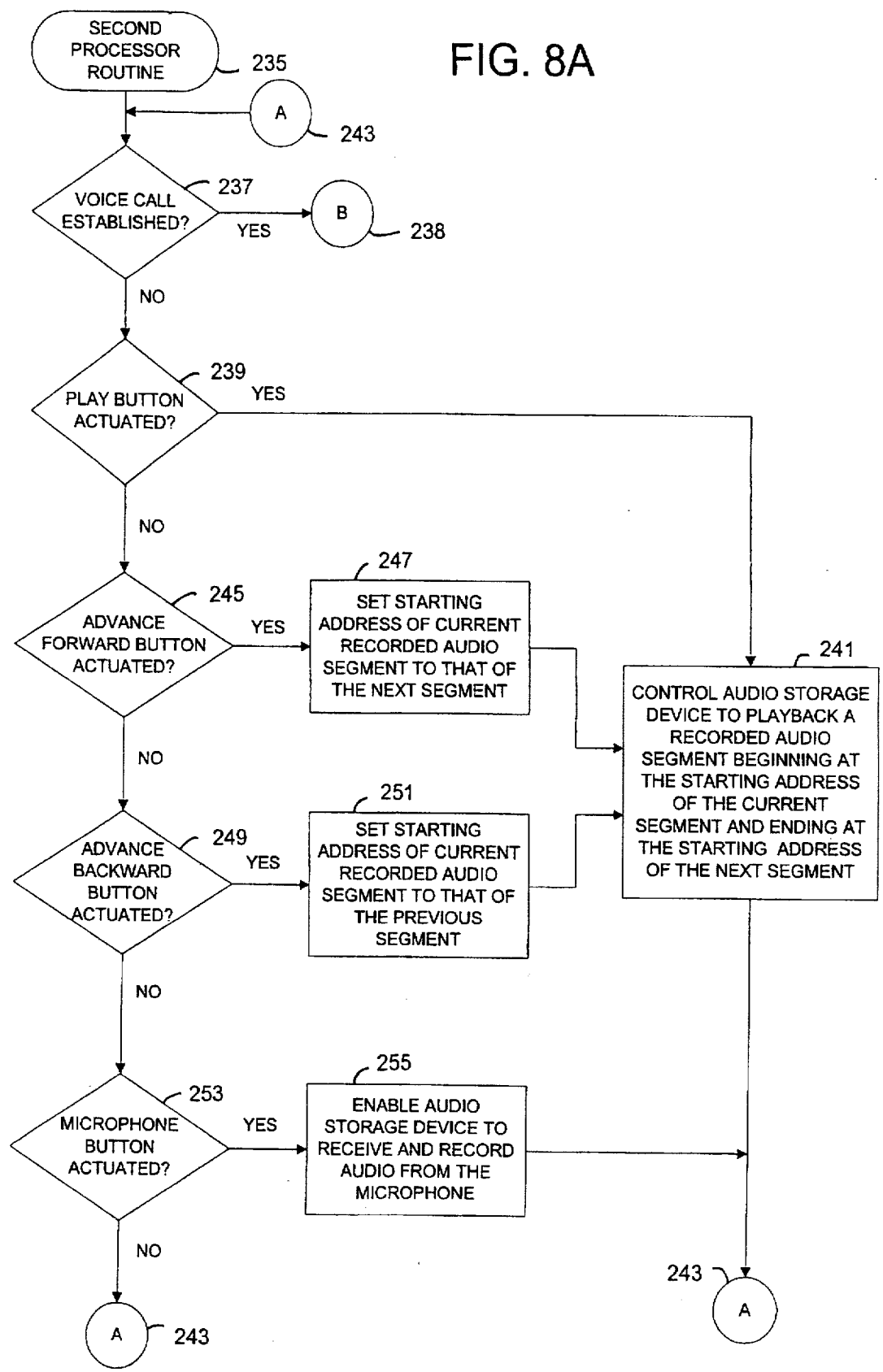
FIGS. 8A and 8B are flowcharts illustrating operations performed by a second microprocessor 67 shown in FIG. 4.

While first microprocessor 66 is performing the functions described above, second microprocessor 67 monitors bus 68 for signals from first microprocessor 66 as well as from switches 83. For example, as illustrated in FIG. 8A, second microprocessor 67 monitors bus 68 to determine whether a voice call has been established (step 237). If a voice call has been established, second microprocessor 67 performs a routine in which it monitors the call for the presence of DTMF signals for purposes of controlling audio storage device 91, which effectively functions as the in-vehicle recorder. The manner in which such functions are performed is described below with reference to FIG. 8B. If a voice call has not been established, second microprocessor 67 monitors whether the play button 97 (FIGS. 2 and 3) has been actuated (step 239). If the play button has been actuated, second microprocessor 67 controls audio storage device 91 to playback a recorded audio segment beginning at a starting address of the currently queued segment and ending at the starting address of the next recorded segment (step 241). The starting address of the current segment remains unchanged unless the advance forward switch or the advance backward switch are actuated. In FIGS. 2 and 3, route switch 108, which is a two-way toggle switch, constitutes both the advance forward and advance backward switches.

If the advance forward switch has been actuated, second microprocessor 67 recognizes this in step 245 and sets the starting address of the current recorded audio segment to that of the next segment in step 247 prior to executing step 241 whereby audio storage device 91 is controlled to playback the recorded audio segment beginning at the then queued starting address of the current segment. On the other hand, if second microprocessor 67 determines in step 249 that the advance backward switch has been actuated, it sets the starting address of the current recorded audio segment to that of the previous segment in step 251 prior to executing step 241 whereby the currently queued segment is played back.

Second microprocessor 67 further detects actuation of the record/microphone switch 96 (step 253). If switch 96 has been actuated, second microprocessor 67 enables audio storage device 91 to receive and record audio from microphone 82 (step 255). In this manner, a vehicle occupant may dictate memos that may be subsequently played back through amplifier 80 and speaker 81. If none of the switches are actuated, or after second microprocessor 67 has executed the required steps following actuation, second microprocessor 67 returns to the beginning of the routine as indicated by connector A (step 243) to reexecute the abovedescribed steps.

If, in step 237, second microprocessor 67 is informed by first microprocessor 66 that a voice call has been established, second microprocessor 67 may enable amplifier 80 (step 257) to enable hands-free communication. Then, in step 259, second microprocessor 67 monitors bus 68 to look for an indication from first microprocessor 66 that a DTMF signal has been received to request that the in-vehicle system activate the audio storage device 91 and begin recording of the voice message transmitted within the call to the vehicle (step 263). Second microprocessor 67 continues to look for such a DTMF signal until a predetermined time period has elapsed (step 261) at which point it returns to step 237 (FIG. 8A).

Figure 8B:
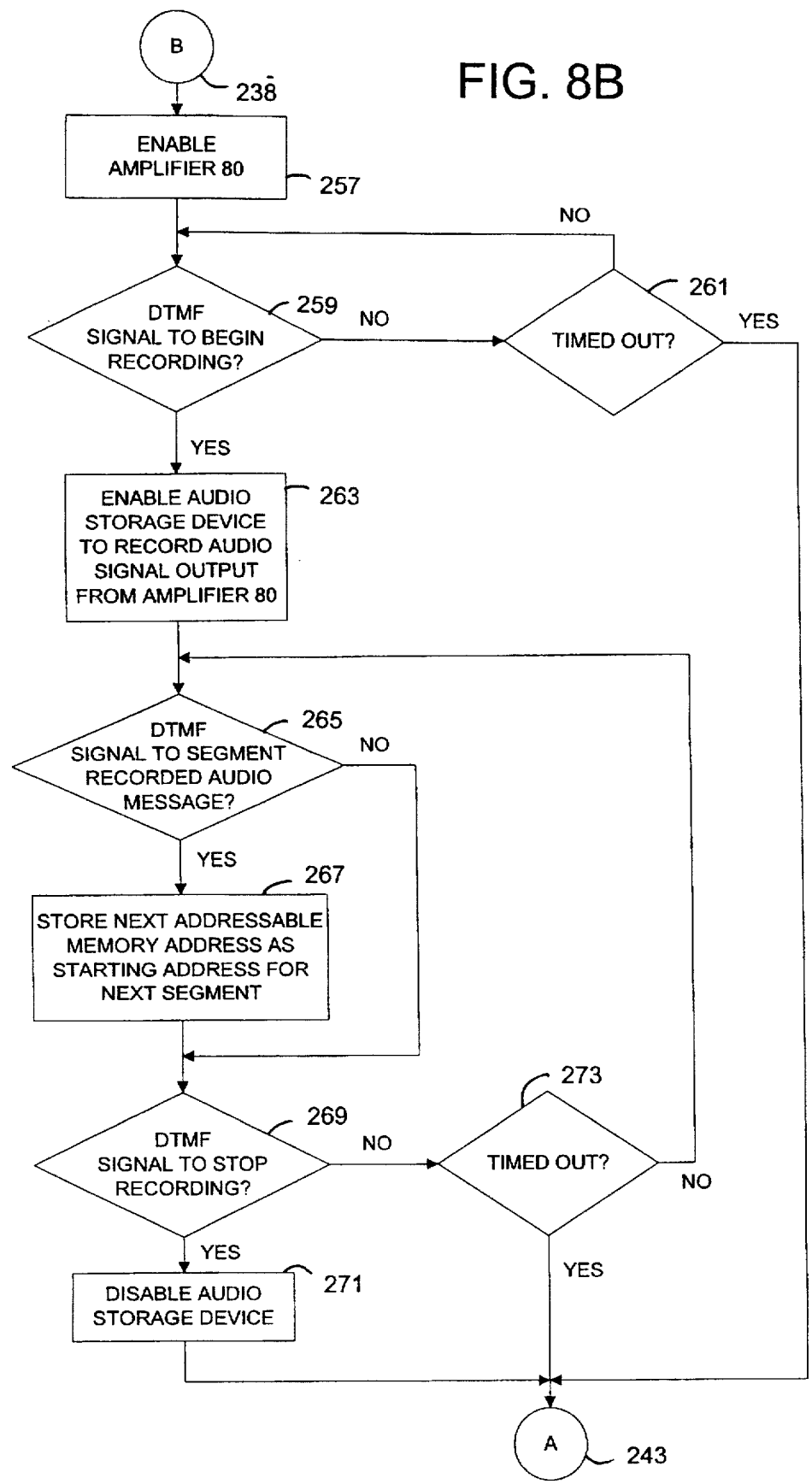

As shown in FIG. 8B, after second microprocessor 67 has enabled audio storage device 91, it then looks for the presence of DTMF signals informing microprocessor 67 to either create a separator to segment the recorded audio message (step 265) or to stop recording altogether (step 269). If a DTMF signal is received instructing the system to segment the recorded audio message, second microprocessor 67 stores the next addressable memory address of the memory in audio storage device 91 as the starting address for the next segment to be recorded (step 267). By storing a sequential list of starting addresses in its own internal memory, second microprocessor 67 may effectively index each recorded segment for subsequent access and playback. So long as a predetermined time period does not elapse (step 273), second microprocessor 67 continues to look for DTMF signals informing it to either identify a new segment or to stop recording. If a DTMF signal is received instructing the system to stop recording, second microprocessor 67 disables audio storage device 91 so that it will no longer continue to record the received voice message (step 271). If an elapsed time has expired, or if a DTMF signal has been received to stop recording, second microprocessor 67 returns to step 237 (FIG. 8A) as indicated by connector A (step 243).

By allowing the remote control of an in-vehicle recorder in this manner, drivers who request navigational instructions may simply press the information switch 107 on their console or mirror and thereby have the system establish a voice communication link with an operator in a service department 11. The operator would preferably receive data from GPS/DGPS module 77 and thereby know the exact location of the vehicle. The driver could then speak into microphone 82 or a microphone within handset 73 to identify a desired destination. The operator then could request additional information about the destination or otherwise determine a proposed route for reaching the desired destination from the vehicle's current location. To accomplish this task, the operator may utilize any conventional automated system for performing this task or determine a route manually. Once the proposed route has been determined, the operator may then transmit a specific DTMF tone by pressing a key on the telephone keypad, in order to instruct the vehicle's system to activate its recorder and begin recording any subsequently spoken messages. Then, the operator may vocally inform the driver of the first navigational step to reach the desired destination. For example, the operator may say "turn left on Main Street." Then, the operator may press another key on the telephone keypad to transmit another DTMF tone which the vehicle system will recognize as a separator so as to begin recording a subsequent segment. The operator will then state the next step in reaching the destination such as "continue on Main Street until you reach Elm Street where you will turn left." The operator will continue in this manner by transmitting the appropriate DTMF signals in between each navigational step until the entire sequence of instructions have been delivered. Once all the instructions have been delivered, the operator may transmit the appropriate DTMF signal to cause the in-vehicle system to stop recording. With the navigational instructions thus recorded in the memory of audio storage device 91, the driver may playback any single step of the entire set of instructions by manipulating the play and advance forward and advance backward switches.

As noted above, the system according to the present invention may be used to activate and/or reprogram other electrical accessories in the vehicle. Such activation and reprogramming may be preformed remotely by transmitting to the system a predetermined sequence of DTMF signals. By allowing the system to respond to DTMF signals in this manner, a user-friendly technique for allowing individuals or service operators to remotely activate or reprogram vehicle accessories may be provided. For example, if an individual locked their keys in their car and wished to have the system unlock the doors, the individual would call the service center to make this request. The service center may implement an automated answering system that plays back recorded options that the caller may select by pressing keys on a telephone keypad and thereby transmit DTMF tones to the service center. An example of the type of audio prompting options that may be played to a caller, are disclosed in U.S. Pat. No. 5,525,977 issued on Jun. 11, 1996.

Figure 9:
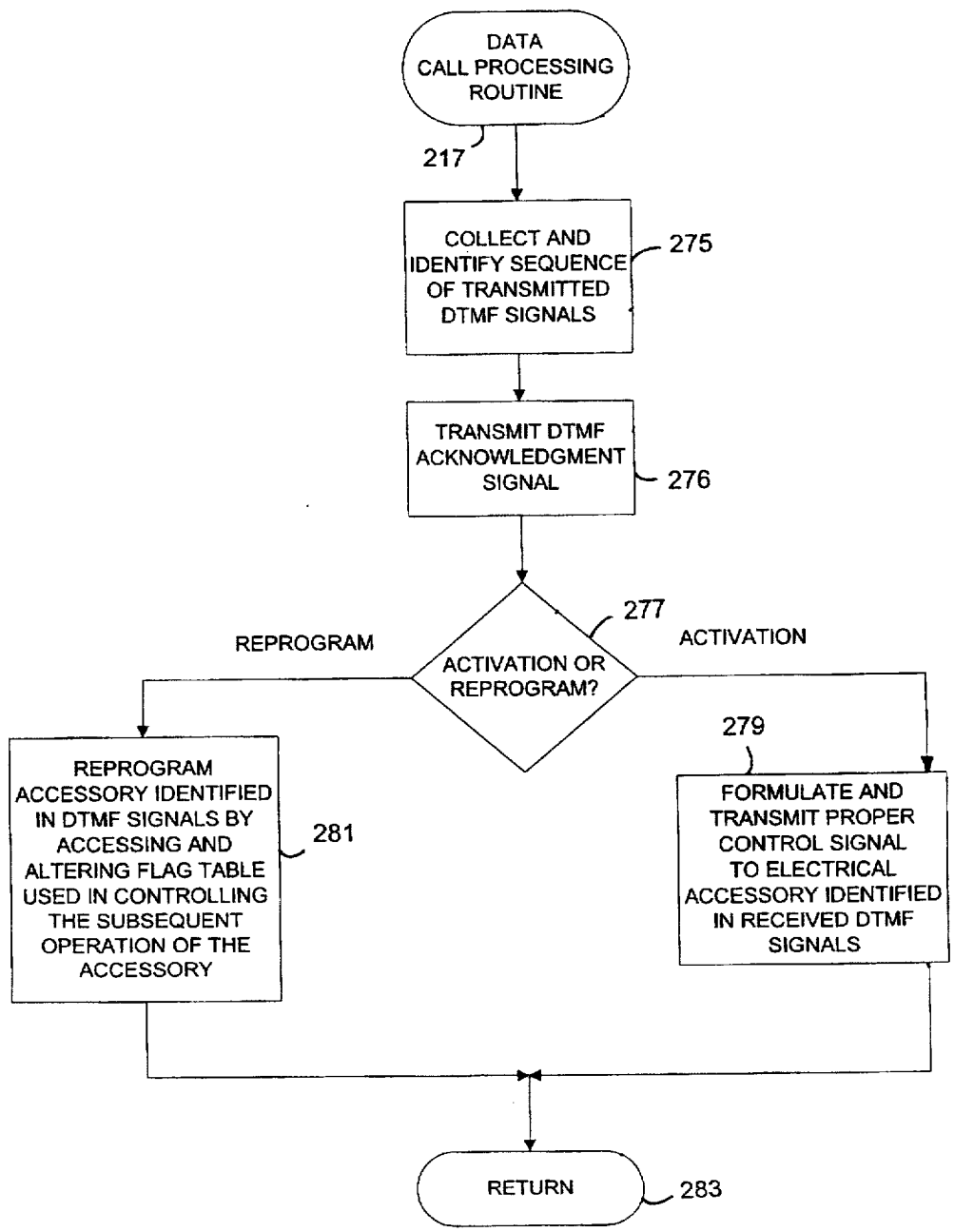
FIG. 9 is a flowchart illustrating a data call processing routine executed by first microprocessor 66.

The service center, in turn, stores the sequence of received DTMF signals that may be subsequently transmitted to the vehicle's system to affect the unlocking of the doors. As shown in FIG. 9, when a sequence of such DTMF signals is received in an incoming call, first microprocessor 66 performs the data call processing routine 217 shown in FIG. 9. In this routine, microprocessor 66 collects and identifies the sequence of transmitted DTMF signals as identified by DTMF decoder 75 (step 275). Once microprocessor 66 has identified the sequence of DTMF signals, microprocessor 66 preferably controls transceiver 70 to transmit a DTMF acknowledgment signal back to the remote party (step 276). From the sequence of DTMF signals, first microprocessor 66 may determine whether or not the received sequence of DTMF signals represents an instruction to activate or reprogram an electrical accessory (step 277). If the received sequence represents an instruction to activate an electrical accessory, first and second microprocessors 66 and 67 cooperate to formulate and transmit a proper control signal to the electrical accessory identified in the received DTMF signals (step 279). Such a control signal may be transmitted through vehicle bus interface 85 and vehicle bus 86 or through a discrete connection 92 to the controlled accessory. If the received sequence of DTMF signals represents an instruction to reprogram one or more vehicle accessories, first and second microprocessors 66 and 67 cooperate to reprogram the identified accessories such that the accessories will subsequently operate in the requested manner. The microprocessors may reprogram the accessories in any conventional manner, such as setting flags in a flag table that is accessed while controlling the various vehicle accessories. Such a reprogramming and control technique is disclosed in allowed U.S. patent application No. 08/484,321 filed on Jun. 7, 1995, and in co-pending U.S. patent application No. 08/874,210 filed on Jun. 13, 1997. Once the requested action has been taken, first microprocessor 66 returns to the low-power sleep state 201 (FIG. 6) as indicated by the return step 283.

Although the invention has been described above as utilizing conventional telephone keypads to generate DTMF signals, it will be appreciated by those skilled in the art that a customized telephone keypad may be utilized to generate DTMF tones not normally generated by a conventional telephone keypad. In this manner, it will be more difficult for an unauthorized person to attempt to transmit DTMF signals to another person's in-vehicle system. Further, any other device that is capable of generating and transmitting DTMF signals may be used in place of a telephone keypad. It should be noted, however, that by utilizing DTMF tones generated by a conventional telephone keypad, a conventional DTMF decoder may be used in the system installed in the vehicle.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A voice recording and playback device for use in a vehicle, said device comprising:

a receiver for receiving a voice message transmitted from a remote location via a wireless link;

a memory device coupled to said receiver for recording a received voice message;

input means for receiving playback commands from a vehicle occupant; and a control circuit coupled to said input means and including means for identifying acoustic data transmitted within a received and recorded voice message, wherein said control circuit is responsive to an identification of acoustic data within a recorded voice message to divide the recorded voice message into separate segments at each location within the recorded voice message where acoustic data is identified, said control circuit controls said memory device to playback a recorded voice message one segment at a time in response to playback commands received by said input means.

2. The device as defined in claim 1 and further including a speaker coupled to said control circuit.

3. The device as defined in claim 1 and further including a microphone coupled to said memory device for receiving a voice message from a vehicle occupant.

4. The device as defined in claim 1, wherein said memory device includes a voice digitizing circuit for digitizing a received voice message prior to recording the voice message.

5. The device as defined in claim 1, wherein a received voice message represents navigational directions for traveling from a first location to a second location and said segments represent separate navigational steps constituting the directions from the first location to the second location.

6. The device as defined in claim 1, wherein said input means includes a user-actuated switch.

7. The device as defined in claim 1, wherein said input means includes a microphone and a voice recognition unit coupled to said control circuit and to said microphone for identifying spoken commands from a vehicle occupant.

8. The device as defined in claim 1, wherein said means for identifying acoustic data includes a DTMF decoder.

9. The device as defined in claim 1, wherein said receiver is a cellular telephone receiver and said acoustic data is represented by DTMF signals.

10. The device as defined in claim 9 and further including a vehicle bus interface for coupling said control circuit to electrical accessories coupled to a vehicle bus, wherein said control circuit is responsive to DTMF signals transmitted within a received cellular telephone call to control one of the electrical accessories coupled to the vehicle bus.

11. The device as defined in claim 10 and further including a prompting circuit responsive to DTMF signals for generating audible prompting messages to prompt a caller to press certain keys on a telephone keypad to cause an identified vehicle accessory to be controlled in a specified manner.

12. The device as defined in claim 1, wherein said control circuit causes an acknowledgment signal to be transmitted to the remote location from which the voice message originated in response to the receipt of acoustic data.

13. A voice recording and playback device for use in a vehicle, said device comprising:
  a cellular telephone transceiver for originating and receiving telephone calls;
  a DTMF decoder coupled to said cellular telephone transceiver for decoding DTMF signals received during a telephone call;
  a memory device coupled to said cellular telephone transceiver for recording a voice message;
  input means for receiving playback commands from a vehicle occupant; and
  playback control circuit coupled to said input means and said DTMF decoder, wherein said playback control circuit is responsive to an identification of DTMF signals within a received voice message to divide the recording of the received voice message into separate segments at each location within the received voice message where a DTMF signal is identified, said playback control circuit controls said memory device to playback a recorded voice message one segment at a time in response to playback commands received by said input means.

14. The device as defined in claim 13, wherein said input means includes a user-actuated switch for inputting playback commands to play a next segment or a previous segment.

15. The device as defined in claim 13, wherein said input means is mounted in an overhead console.

16. The device as defined in claim 13, wherein said input means is mounted in a rearview mirror.

17. The device as defined in claim 13 and further including a display coupled to said playback control circuit for displaying an identification of the current segment of the recorded voice message that is currently being played.

18. The device as defined in claim 13, wherein a received voice message represents navigational directions for traveling from a first location to a second location and said segments represent separate navigational steps constituting the directions from the first location to the second location.

19. The device as defined in claim 13, wherein said playback control circuit causes said cellular telephone transceiver to transmit a DTMF acknowledgment signal in response to the receipt of a DTMF signal.

20. A navigation system for use in a vehicle, said system comprising:
  a cellular telephone transceiver for originating and receiving cellular telephone calls;
  a DTMF decoder coupled to said cellular telephone transceiver for decoding DTMF signals received during a telephone call;
  a memory device coupled to said cellular telephone transceiver for recording a voice message including navigational information;
  input means for receiving playback commands from a vehicle occupant; and
  a control circuit coupled to said input means and said DTMF decoder, wherein said control circuit is responsive to an identification of DTMF signals within a received voice message to divide the recording of the received voice message into separate navigational segments at each location within the received voice message where a DTMF signal is identified, said control circuit controls said memory device to playback a recorded voice message one navigational segment at a time in response to playback commands received by said input means.

21. A voice recording device for use in a vehicle, said device comprising:
  a cellular telephone transceiver for originating and receiving telephone calls;
  a DTMF decoder coupled to said cellular telephone transceiver for decoding DTMF signals received during a telephone call;
  a memory device coupled to said cellular telephone transceiver for recording a voice message; and
  a control circuit coupled to said DTMF decoder, wherein said control circuit is responsive to an identification of a DTMF signal received during a telephone call that is originated or answered by a vehicle occupant, to commence/halt the recording of a received voice message in said memory device.

22. The device as defined in claim 21 and further including an input circuit for receiving playback commands from a vehicle occupant, wherein said control circuit controls said memory device to playback a recorded voice message in response to playback commands received by said input circuit.

23. A system for remotely controlling vehicle accessories, said system comprising:
  a cellular telephone receiver for receiving cellular telephone calls;
  a DTMF decoder coupled to said cellular telephone receiver for decoding DTMF signals received during a telephone call;

a vehicle accessory interface for coupling to an electrical accessory; and a control circuit coupled to said vehicle accessory interface and to said DTMF decoder for controlling the electrical accessory that is coupled to the vehicle accessory interface, in response to received DTMF signals.

24. The system as defined in claim 23 and further including a prompting circuit responsive to DTMF signals for generating audible prompting messages to prompt a caller to press certain keys on a telephone keypad to cause an identified vehicle accessory to be controlled in a specified manner.

25. The system as defined in claim 23 and further including a memory device coupled to said cellular telephone receiver for recording a voice message, and input means for receiving playback comnmnands from a vehicle occupant, wherein said control circuit is coupled to said input means and is responsive to an identification of DTMF signals within a received voice message to divide the recording of the received voice message into separate segments at each location within the received voice message where a DTMF signal is identified, said control circuit controls said memory device to playback a recorded voice message one segment at a time in response to playback commands received by said input means.

26. The system as defined in claim 23, wherein said vehicle accessory interface is a vehicle bus interface for coupling to a vehicle bus to which a plurality of electrical accessories are coupled.

27. The system as defined in claim 23, wherein said vehicle accessory interface is a discrete wire interface to which the electrical accessory is coupled.

28. The system as defined in claim 23, wherein said vehicle accessory interface is a discrete wire interface to which a plurality of electrical accessories are coupled.

29. A system for remotely personalizing vehicle accessories, said system comprising:

a cellular telephone receiver for receiving cellular telephone calls;

a DTMF decoder coupled to said cellular telephone receiver for decoding DTMF signals received during a telephone call;

a vehicle accessory interface for coupling to a plurality of electrical accessories; and a control circuit coupled to said vehicle accessory interface and to said DTMF decoder for reprogramming electrical accessories that are coupled to the vehicle accessory interface, in response to received DTMF signals.

30. The system as defined in claim 29 and further including a prompting circuit responsive to DTMF tones for generating audible prompting messages to prompt a caller to press certain keys on a telephone keypad to cause an identified vehicle accessory to be reprogrammed in a specified manner.

31. The system as defined in claim 29 and further including a memory device coupled to said cellular telephone receiver for recording a voice message, and input means for receiving playback commands from a vehicle occupant, wherein said control circuit is coupled to said input means and is responsive to an identification of DTMF signals within a received voice message to divide the recording of the received voice message into separate segments at each location within the received voice message where a DTMF signal is identified, said control circuit controls said memory device to playback a recorded voice message one segment at a time in response to playback commands received by said input means.

32. The system as defined in claim 29, wherein said vehicle accessory interface is a vehicle bus interface for coupling to a vehicle bus to which the plurality of electrical accessories are coupled.

33. The system as defined in claim 29, wherein said vehicle accessory interface is a discrete wire interface to which the plurality of electrical accessories are coupled.

* * * * *